Nov. 2, 1926.
G. C. VOSS
1,605,877
POULTRY ROOST
Filed Feb. 8, 1926
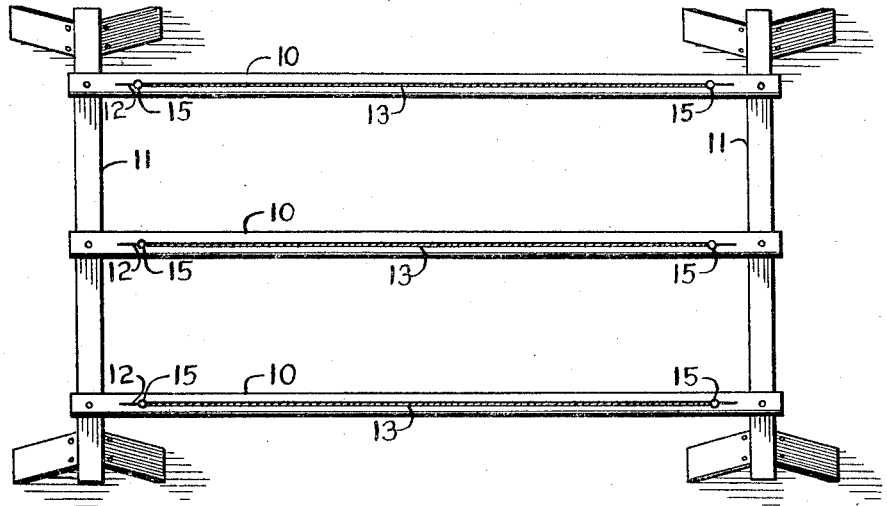
Fig. 1.
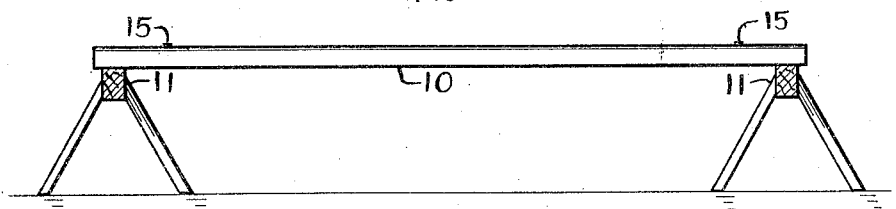
Fig. 2.
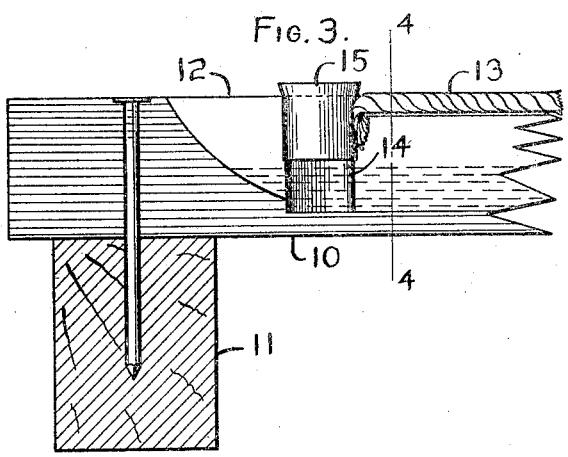
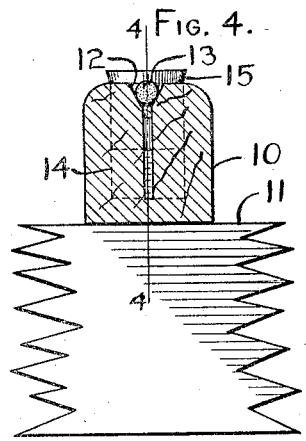
INVENTOR.
George C. Voss
BY
ATTORNEY.

Patented Nov. 2, 1926.

1,605,877

UNITED STATES PATENT OFFICE.

GEORGE C. VOSS, OF EXIRA, IOWA.

POULTRY ROOST.

Application filed February 8, 1926. Serial No. 86,816.

An object of this invention is to provide a poultry roost embodying a reservoir adapted to contain insecticide in solution.

A further object of this invention is to provide an insecticide-containing poultry roost having a suitable porous cover or protector over the insecticide reservoir and wholly out of contact with the insecticide contained therein.

A further object of this invention is to provide a device of the class described wherein the liquid insecticide does not come into direct contact with the fowls.

A further object of this invention is to provide a device of the class described which permits sufficient insecticide to seep through the bottom of the roost to prevent mites or other insects from harboring in the crevices between said roost and its supports.

A further object of this invention is to provide a device of the class described wherein the cover or protector is firmly retained, yet easily removable for cleaning or replacement.

A further object of this invention is to provide a device of the class described in which the supply of insecticide is easily renewable.

A further object of this invention is to provide a device of the class described which embodies the above named improvements in a simple and inexpensive form.

My invention consists in the construction, arrangement and combination of elements hereinafter set forth, pointed out in the claims and illustrated by the accompanying drawing, in which:—

Fig. 1 is a plan depicting an assembly of three of my improved roosts mounted on suitable supports, Fig. 2 shows a side elevation of the same, Fig. 3 is a longitudinal section of one end portion of my improved poultry roost, illustrating details of its construction, and Fig. 4 is a cross section on the indicated line 4—4 of Fig. 3.

In Figs. 1 and 2 three roosts are shown, 10—10—10. These are preferably of wood or its equivalent and are laid transversely of two supporting trestles 11—11. Any well known means of support and fastening for the roosts may be used, as this forms no part of my invention.

In the detail views, Figs. 3 and 4, 12 indicates a vertical, longitudinal slot adapted to contain a supply of insecticide. As clearly shown in Fig. 4, the side walls of the slot 12 diverge near the top, forming a V-shaped groove in which is placed a protector 13, preferably of soft, porous material.

In use the protector 13 is soon shaped to fit its slot and flattened on top by the weight of the fowls, thus forming a tight closure for the insecticide contained in the slot 12, yet permitting upward emanation and dissemination of the vapor arising from the same.

Near each end of the slot 12 is a well 14, preferably closed by an ordinary cork stopper 15. The protector 13 is arranged to intersect the wells 14—14, and the seating of stoppers 15—15 causes them to engage and retain the ends of and hold said protector in position.

The slot 12 is sawed nearly to the bottom of the roost 10, the thin portion of material remaining below said slot allowing sufficient seepage of insecticide to moisten said bottom and prevent insects from remaining in the crevices between a roost 10 and a support 11.

A roost 10 may be fastened to a support 11 by means of nails as shown or in any desired manner, this being irrelevant to my invention.

The operation of my improved poultry roost is as follows:—

The slot 12 is filled with insecticide to about the level shown, through one of the wells 14, and its stopper 15 is replaced.

Fowls when roosting loosen their feathers, hover closely on the roost and experience a rise in temperature. This rise in temperature, being conducted to the insecticide in the slot 12, causes it to give off vapor, which permeates through the pores of the protector 13 and thence between the feathers of the fowl.

Special emphasis is laid on the fact that protector 13 is kept entirely out of contact with the insecticide in slot 12, thus having no opportunity to act as a wick, rapidly exhaust the supply of liquid, burn the fowls and discolor their plumage.

I claim as my invention—

An improved poultry roost comprising a substantially horizontal bar formed with a longitudinal reservoir opening to the top thereof only and adapted to contain insecticide, a porous protector mounted in and covering the top of said reservoir, said protector being wholly out of contact with said insecticide, said bar also being formed with wells near each one of and bisecting said reservoir, together with removable means adapted to cover said filling wells and also adapted to engage and retain the ends of said protector.

GEORGE C. VOSS.